May 7, 1940.    S. H. SWARTHOUT    2,199,600
MOTOR CONTROL SYSTEM
Filed June 12, 1939
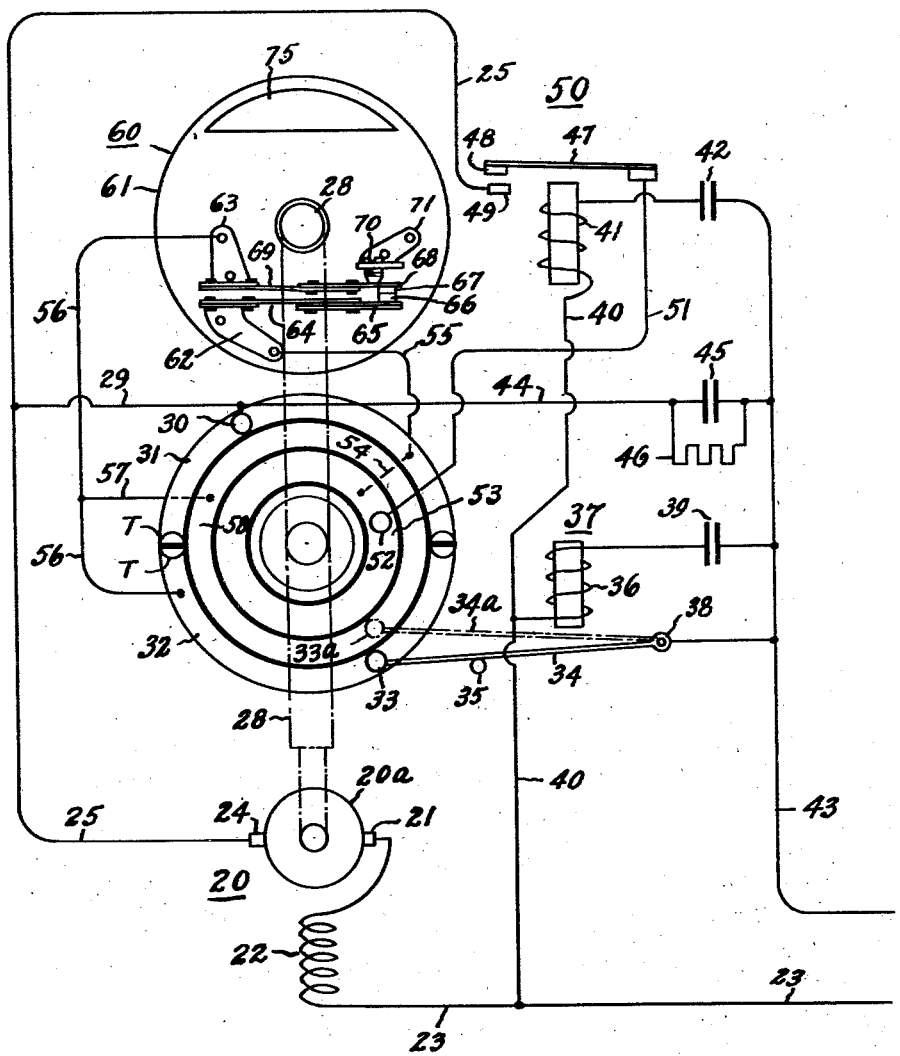
INVENTOR
Stanley H. Swarthout
BY
Spencer Hardman & Fehr
his ATTORNEYS Patented May 7, 1940

2,199,600

UNITED STATES PATENT OFFICE 2,199,600

MOTOR CONTROL SYSTEM

Stanley H. Swarthout, Rochester, N. Y., assignor to General Motors Corporation, Detroit, Mich., a corporation of Delaware Application June 12, 1939, Serial No. 278,706

2 Claims. (Cl. 171—222)

This invention relates to a governor for a universal motor which will operate either on direct or alternating current.

The type of universal motor speed control system to which the present invention relates is the type shown in my copending application Serial No. 215,426 filed June 23, 1938, now Patent No. 2,157,640, issued May 9, 1939. My application discloses a system which includes two speed responsive circuit breakers one of which is used when the motor operates on direct current and the other of which is used when the motor operates on alternating current. It is the aim and object of my invention to provide a system of control in which one speed responsive circuit breaker is used to control the speed of the motor when operating either on direct or on alternating current.

Further objects and advantages of the present invention will be apparent from the following description, reference being had to the accompanying drawing wherein a preferred embodiment of the present invention is clearly shown.

In the drawing:

The figure of the drawing is a wiring diagram showing a motor control system embodying my invention.

In the drawing, 20 designates a commutator type series wound motor which operates either on direct or alternating current. The motor brush 21 is connected with the field 22 which is connected with line wire 23. The other brush 24 is connected by wires 25 and 29 with a collector brush 30 engageable with a collector half segment 31. The other half segment 32 is engaged by a brush 33 carried by armature 34 of relay 37 normally resting against the stop 35, as shown in full lines, but movable by the attractive force produced by magnet coil 36 into the dot dash line position 34a in which its brush located at 33a engages a collector ring 58. The pivot 38 of arm 34 is connected with line wire 43. One end of magnet coil 36 is connected through condenser 39 with wire 43 and the other end of the coil 36 is connected with a wire 40 connected also with a relay 50 having a magnet coil 41 which is connected by condenser 42 with wire 43. The collector brush 30 is connected by wire 44 with condenser 45 shunted by non-inductive resistance 46 and connected with line wire 43. The relay 50 has an armature 47 carrying a contact 48 normally out of engagement with a contact 49 which is connected with wire 25 with collector brush 26. The armature 47 is connected by wire 51 with a collector brush 52 engageable with collector ring 53. Ring 53 is connected by wire 54 with half segment 31. Half segment 31 is connected by wire 55 with terminal bracket 62 of a speed responsive switch 60.

The centrifugal switch 60 comprises a disc 61 driven by the motor shaft 28. Disc 61 supports the terminal bracket 62 and a terminal bracket 63 to which wire 56 is connected. Bracket 62 carries a metal leaf spring member 64 the free end of which carries a laminated weight piece 65 carrying a contact 66 normally engageable with a contact 67 carried by bar 68 riveted to a leaf spring 69 attached to the bracket 63. The normal pressure of engagement between the contacts 66 and 67 is regulated by an adjusting screw 70 threaded into a bracket 71 carried by the disc 61. If the screw 70 is rotated so that it moves downwardly, as viewed in the drawing, the two contacts 67 and 66 are moved downwardly together thereby increasing the tension of the spring 64. This adjustment would govern the motor for higher speed because greater centrifugal force would be required to separate the contact 66 from the contact 67. Conversely, the motor can be regulated for a lower speed by threading the screw 70 upwardly, as viewed in the drawing, so as to reduce the tension between the contacts by reducing the tension of the spring 64 which of course is biased upwardly as viewed in the drawing. The centrifugal switch 60 controls the speed of the motor by opening its circuit. As the speed of the motor rises above a predetermined value the contacts 66 and 67 separate to decrease the speed of the motor. As the speed falls below a predetermined value the contacts close.

There is fairly rapid rate of separation and closing of the contacts 66 and 67 in order to govern the speed of the motor. There will be some arcing at these contacts. In order to produce as flat a contact operation as possible, the polarity of the direct current passing through the contacts 66 and 67 is reversed twice for each revolution of the shaft 28. Reversal of current is effected by the combination of the brushes 30 and 33 with the insulated collector half segments 31 and 32.

In order to minimize the effect of sparking as each of the segments 31 and 32 leave one brush and goes into contact with another brush each segment is provided at its end with inserts T of arc resisting metal such as tungsten.

The disc 61 is provided with a weight 75 to counterbalance the centrifugal switch parts.

For direct current operation, the magnets 36 and 41 are deenergized so that contacts 48 and 49 of relay 50 are opened and brush 33 on armature 34 of relay 37 is in the lower full line position. The circuit through the motor 20 includes line wire 23, field coil 22, brush 21, armature 20a, brush 24, wire 25, wire 29, brush 30, collector segment 31, wire 55, terminal bracket 62, contact arm 64, contact weight plate 65, contact 66, contact 67, contact plate 68, contact arm 69, terminal bracket 63, wire 56, collector segment 32, brush 33, arm 34, pivot 38, line wire 43. As previously explained, the brushes 30 and 33 cooperate with the half segments 31 and 32 to reverse the current across the switch contacts 66 and 67 twice during each revolution of the shaft 28.

When the motor is operating on alternating current the A. C. current will pass the condensers 39 and 42 and the relay magnet windings 36 and 41 of relays 37 and 50, respectively, will be energized so that the contacts 48 and 49 will be closed and the arm 34 will be moved to the dot dash line position 34a thereby locating brush 33 at position 33a in contact with collector ring 58. Then the A. C. circuit of the motor is as follows: wire 23, field coil 22, brush 21, armature 20a, brush 24, wire 25, contact 49 of relay 50, contact 48, armature 47, wire 51, brush 52, ring 53, wire 54, wire 55, terminal bracket 62, arm 64, weight 65, contact 66, contact 67, plate 68, arm 69, bracket 63, wire 56, wire 57, ring 58, brush 33 (at 33a), armature 34 (at 34a) pivot 38, lead 43.

The collector segments 31 and 32 are not in the A. C. circuit of the motor since current reversal at the contacts of switch 60 is provided for by the alternating current.

The condenser 45 and the non-inductive resistance tend to reduce sparking at the contacts of relay 50.

From the foregoing description of the construction and mode of operation of my system, it is apparent that I have provided for the governing of the speed of a universal motor by means of circuit controlling relays and a single centrifugal switch, the contacts of which are protected during direct current operation by a polarity reversing device driven by the motor.

While the embodiment of the present invention as herein disclosed, constitutes a preferred form, it is to be understood that other forms might be adopted, all coming within the scope of the claims which follow.

What is claimed is as follows:

1. A system of speed control for universal motors comprising, in combination, a universal motor adapted to operate either on direct or on alternating current, a centrifugal switch driven by the motor, a circuit making device driven by the motor and comprising a ring divided into two segments connected respectively with the terminals of the centrifugal switch and uninterrupted collector rings connected respectively with the terminals of said centrifugal switch, means including opposed brushes for normally connecting the divided ring in the circuit of the supply line and motor whereby the polarity of the centrifugal switch is reversed by the motor when operating on direct current, and means responsive to the passage of alternating current for connecting the collector rings into the circuit of the supply line and motor and for disconnecting the divided ring.

2. The system according to claim 1 in which an A. C. relay connects one of the collector rings into the circuit of the supply line and motor and in which a second A. C. relay shifts a brush from the divided ring into contact with another of the collector rings.

STANLEY H. SWARTHOUT.